United States Patent [19]
Dettling et al.

[11] Patent Number: 5,997,831
[45] Date of Patent: *Dec. 7, 1999

[54] METHOD OF CATALYTICALLY TREATING THE ATMOSPHERE AND HEAT EXCHANGE DEVICES PRODUCED THEREBY

[75] Inventors: Joseph C. Dettling, Howell, N.J.; Jeffrey B. Hoke, North Brunswick, N.J.

[73] Assignee: Engelhard Corporation, Iselin, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/695,687

[22] Filed: Jul. 12, 1996

[51] Int. Cl.⁶ ............................... C01B 13/00; B01J 8/00
[52] U.S. Cl. .................. 423/219; 423/245.1; 423/245.3; 423/247
[58] Field of Search .................... 423/219, 245, 423/243.3, 247

[56] References Cited

U.S. PATENT DOCUMENTS

| | | |
|---|---|---|
| 1,484,782 | 2/1924 | Heise . |
| 1,628,344 | 5/1927 | Walsh . |
| 1,863,015 | 6/1932 | Kamrath . |
| 1,937,488 | 11/1933 | Jenness ........................ 23/234 |
| 1,937,489 | 11/1933 | Jenness ........................ 23/234 |
| 2,213,017 | 8/1940 | Perkins ............................ 98/2 |
| 2,455,734 | 12/1948 | Clausen ........................ 183/53 |
| 2,473,563 | 6/1949 | Beja et al. .................... 23/145 |
| 2,551,823 | 2/1951 | Buttner et al. .............. 237/28 |
| 2,658,742 | 11/1953 | Suter et al. ................... 263/3 |
| 2,701,104 | 2/1955 | Fox ................................ 241/3 |
| 2,956,860 | 10/1960 | Welsh ........................... 23/145 |
| 2,966,339 | 12/1960 | Morgan ......................... 257/1 |
| 3,110,300 | 11/1963 | Brown et al. ............... 126/109 |
| 3,147,100 | 9/1964 | Wilber ......................... 55/419 |
| 3,242,013 | 3/1966 | Mehne et al. .............. 136/138 |
| 3,269,801 | 8/1966 | Boberg et al. ............... 23/238 |
| 3,356,452 | 12/1967 | Moore .......................... 23/145 |
| 3,414,440 | 12/1968 | Moore ......................... 136/107 |
| 3,565,203 | 2/1971 | Ashton et al. ............... 180/68 |
| 3,596,441 | 8/1971 | Luedahl ........................ 55/376 |
| 3,640,683 | 2/1972 | Miyazaki et al. ........... 23/145 |
| 3,685,983 | 8/1972 | Louzos .......................... 75/5 R |

(List continued on next page.)

FOREIGN PATENT DOCUMENTS

| | | |
|---|---|---|
| 0 097 287 A2 | 1/1984 | European Pat. Off. .......... F28D 1/04 |
| 0 097 287 B1 | 1/1984 | European Pat. Off. .......... F28D 1/04 |
| 0 186 477 | 7/1986 | European Pat. Off. .......... F24F 3/12 |
| 0 186 477 A2 | 7/1986 | European Pat. Off. .......... F24F 3/12 |
| 0 351 036 A1 | 1/1990 | European Pat. Off. ......... B01J 35/02 |
| 0 561 484 A1 | 9/1993 | European Pat. Off. ........ B01D 53/36 |
| 822 053 | 11/1951 | Germany . |
| 1067691 | 10/1959 | Germany . |
| 1095128 | 12/1960 | Germany . |
| 1101160 | 3/1961 | Germany . |
| 1133154 | 7/1962 | Germany . |
| 25 49 621 B2 | 5/1977 | Germany . |
| 33 34 992 A1 | 4/1985 | Germany ........................ B60H 3/00 |
| 40 07 964 A1 | 9/1991 | Germany ........................ B01J 23/72 |
| 40 07 965 A1 | 9/1991 | Germany ........................ B01J 23/84 |
| 40 07 965 C2 | 9/1991 | Germany ........................ B01J 23/72 |
| 4007965 | 10/1991 | Germany . |
| 44 20 224 A1 | 1/1995 | Germany ...................... B01D 53/86 |
| 44 23 329 A1 | 1/1995 | Germany ...................... B01D 53/86 |
| 3-229645 | 3/1991 | Japan . |
| WO 96/22146 | 7/1996 | WIPO ........................... B01D 53/68 |
| WO 96/22148 | 7/1996 | WIPO ........................... B01D 53/88 |
| WO 96/22149 | 7/1996 | WIPO ........................... B01D 53/88 |
| WO 96/22150 | 7/1996 | WIPO ........................... B01D 53/88 |

OTHER PUBLICATIONS

Derwent Abstracts (see attached).
Manganese Compounds, vol. 15, pp. 1030–1050.

*Primary Examiner*—Gary P. Straub
*Attorney, Agent, or Firm*—Stephen I. Miller; Theodore J. Shatynski

[57] ABSTRACT

Method of catalytically activating the surface of a heat exchange device while retaining the heat exchange properties of the device and heat exchange devices obtained thereby.

26 Claims, 3 Drawing Sheets

U.S. PATENT DOCUMENTS

| | | | |
|---|---|---|---|
| 3,738,088 | 6/1973 | Colosimo | 123/119 R |
| 3,770,868 | 11/1973 | Swinkels et al. | 423/50 |
| 3,823,533 | 7/1974 | Alverson et al. | 55/493 |
| 3,837,149 | 9/1974 | West et al. | 55/269 |
| 3,864,118 | 2/1975 | Schumacher et al. | 75/3 |
| 3,883,637 | 5/1975 | Benedict | 423/230 |
| 3,893,870 | 7/1975 | Kozawa | 136/179 |
| 3,915,837 | 10/1975 | Feige, Jr. | 204/286 |
| 3,959,021 | 5/1976 | Nishino et al. | 136/138 |
| 3,959,764 | 5/1976 | Allman | 338/34 |
| 3,993,597 | 11/1976 | Stiles | 252/454 |
| 4,006,217 | 2/1977 | Faber et al. | 423/605 |
| 4,007,875 | 2/1977 | Stolz et al. | 237/12.3 A |
| 4,078,893 | 3/1978 | Gilman et al. | 423/219 |
| 4,089,928 | 5/1978 | Foroglou | 423/49 |
| 4,101,296 | 7/1978 | Lowther | 55/33 |
| 4,141,963 | 2/1979 | Miller | 423/592 |
| 4,171,211 | 10/1979 | Carter | 55/493 |
| 4,173,549 | 11/1979 | Kent et al. | 252/463 |
| 4,184,983 | 1/1980 | Putz et al. | 252/466 PT |
| 4,197,366 | 4/1980 | Tamura et al. | 429/197 |
| 4,200,609 | 4/1980 | Byrd | 422/122 |
| 4,207,291 | 6/1980 | Byrd et al. | 422/122 |
| 4,234,326 | 11/1980 | Bailey et al. | 55/278 |
| 4,246,253 | 1/1981 | Hunter | 423/605 |
| 4,261,863 | 4/1981 | Kent et al. | 252/463 |
| 4,277,360 | 7/1981 | Mellors et al. | 252/182.1 |
| 4,284,618 | 8/1981 | Van der Heyden et al. | 423/605 |
| 4,285,913 | 8/1981 | Soni et al. | 423/50 |
| 4,302,490 | 11/1981 | Byrd | 427/301 |
| 4,310,494 | 1/1982 | Welsh | 423/49 |
| 4,343,776 | 8/1982 | Carr et al. | 423/210 |
| 4,352,321 | 10/1982 | Fukui et al. | 98/2.11 |
| 4,363,787 | 12/1982 | Yoon | 422/201 |
| 4,379,817 | 4/1983 | Kozawa | 429/224 |
| 4,399,185 | 8/1983 | Petrow | 428/253 |
| 4,402,931 | 9/1983 | Tanabe et al. | 423/605 |
| 4,405,699 | 9/1983 | Kruger | 429/224 |
| 4,425,145 | 1/1984 | Reese | 55/385 B |
| 4,476,104 | 10/1984 | Mellors | 423/605 |
| 4,477,541 | 10/1984 | Fraioli | 429/33 |
| 4,483,828 | 11/1984 | Laughlin et al. | 423/49 |
| 4,485,073 | 11/1984 | Robertson et al. | 423/49 |
| 4,489,043 | 12/1984 | Bowerman et al. | 423/49 |
| 4,551,254 | 11/1985 | Imada et al. | 210/688 |
| 4,579,723 | 4/1986 | Weltmer et al. | 423/219 |
| 4,581,219 | 4/1986 | Imada et al. | 423/605 |
| 4,585,718 | 4/1986 | Uedaira et al. | 429/224 |
| 4,590,059 | 5/1986 | Mellors | 423/605 |
| 4,595,643 | 6/1986 | Koshiba et al. | 429/27 |
| 4,604,336 | 8/1986 | Nardi | 429/224 |
| 4,619,821 | 10/1986 | Ely | 423/579 |
| 4,657,887 | 4/1987 | Hardman et al. | 502/303 |
| 4,662,065 | 5/1987 | Marincic et al. | 29/623.1 |
| 4,684,381 | 8/1987 | Wasylyniuk | 55/316 |
| 4,733,605 | 3/1988 | Hölter et al. | 98/2.11 |
| 4,734,113 | 3/1988 | Takagi et al. | 55/504 |
| 4,742,038 | 5/1988 | Matsumoto | 502/303 |
| 4,818,354 | 4/1989 | Preisler et al. | 204/96 |
| 4,824,363 | 4/1989 | Abthoff et al. | 432/222 |
| 4,838,910 | 6/1989 | Stollenwerk et al. | 55/385.2 |
| 4,871,709 | 10/1989 | Tatsushima et al. | 502/324 |
| 4,921,689 | 5/1990 | Walker et al. | 423/605 |
| 4,961,762 | 10/1990 | Howeth | 55/302 |
| 4,975,346 | 12/1990 | Lecerf et al. | 429/197 |
| 4,981,695 | 1/1991 | Chuang et al. | 423/235 |
| 5,004,487 | 4/1991 | Kowalczyk | 55/269 |
| 5,080,882 | 1/1992 | Yoshimoto et al. | 423/579 |
| 5,082,570 | 1/1992 | Higgins et al. | 210/683 |
| 5,085,266 | 2/1992 | Arold et al. | 165/1 |
| 5,092,396 | 3/1992 | Murano et al. | 165/119 |
| 5,142,864 | 9/1992 | Dunne | 60/274 |
| 5,145,657 | 9/1992 | Kobayashi et al. | 423/219 |
| 5,145,822 | 9/1992 | Falke et al. | 423/219 |
| 5,147,429 | 9/1992 | Bartholomew et al. | 55/256 |
| 5,160,586 | 11/1992 | Yoshimoto et al. | 204/59 R |
| 5,162,274 | 11/1992 | Deitz | 502/51 |
| 5,176,833 | 1/1993 | Vaughn et al. | 210/638 |
| 5,180,502 | 1/1993 | Nishiki et al. | 210/748 |
| 5,187,137 | 2/1993 | Terui et al. | 502/241 |
| 5,194,233 | 3/1993 | Kitahara et al. | 423/210 |
| 5,212,140 | 5/1993 | Yoshimoto et al. | 502/300 |
| 5,214,014 | 5/1993 | Yoshimoto et al. | 502/84 |
| 5,221,649 | 6/1993 | Yoshimoto et al. | 502/84 |
| 5,221,652 | 6/1993 | Tierney et al. | 502/170 |
| 5,227,144 | 7/1993 | Perez de la Garza | 423/210 |
| 5,232,882 | 8/1993 | Yoshimoto et al. | 502/5 |
| 5,232,886 | 8/1993 | Yoshimoto et al. | 502/84 |
| 5,262,129 | 11/1993 | Terada et al. | 422/122 |
| 5,277,890 | 1/1994 | Wang et al. | 423/605 |
| 5,283,041 | 2/1994 | Nguyen et al. | 423/240 |
| 5,283,139 | 2/1994 | Newman et al. | 429/224 |
| 5,294,499 | 3/1994 | Furukawa et al. | 429/164 |
| 5,296,435 | 3/1994 | Kitaguchi et al. | 502/174 |
| 5,340,562 | 8/1994 | O'Young et al. | 423/599 |
| 5,348,726 | 9/1994 | Wang et al. | 423/605 |
| 5,356,457 | 10/1994 | Alvarez et al. | 75/710 |
| 5,382,417 | 1/1995 | Haase | 423/219 |
| 5,391,365 | 2/1995 | Wang et al. | 423/605 |
| 5,395,534 | 3/1995 | Smith | 210/688 |
| 5,401,477 | 3/1995 | Cawlfield et al. | 423/50 |
| 5,405,594 | 4/1995 | Andersen et al. | 423/605 |
| 5,411,643 | 5/1995 | Cawlfield et al. | 204/115 |
| 5,419,882 | 5/1995 | Jibiki | 423/111 |
| 5,422,331 | 6/1995 | Gallisan et al. | 502/333 |
| 5,447,693 | 9/1995 | Ohta et al. | 422/122 |
| 5,620,672 | 4/1997 | Galligan et al. | 423/219 |

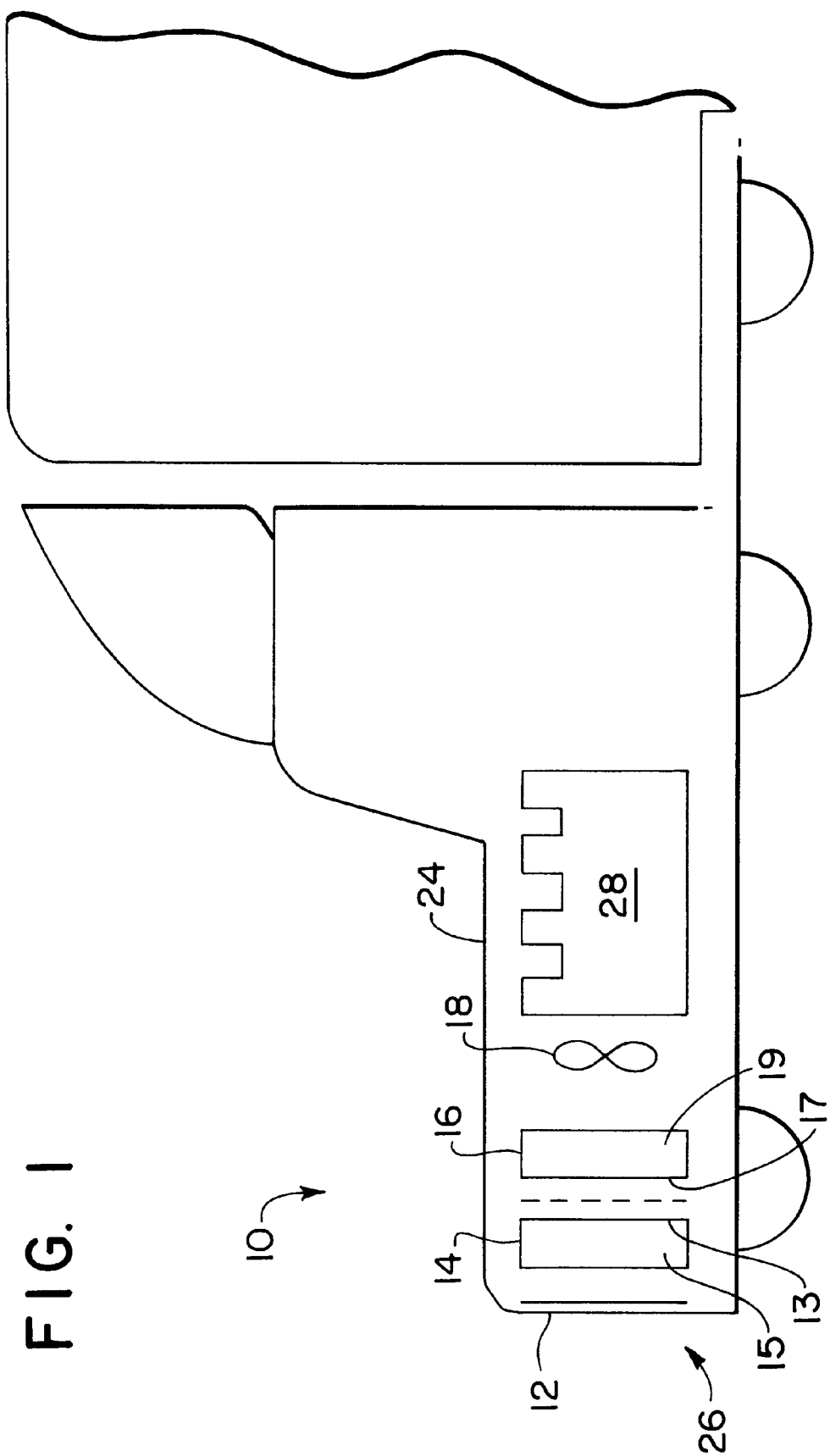

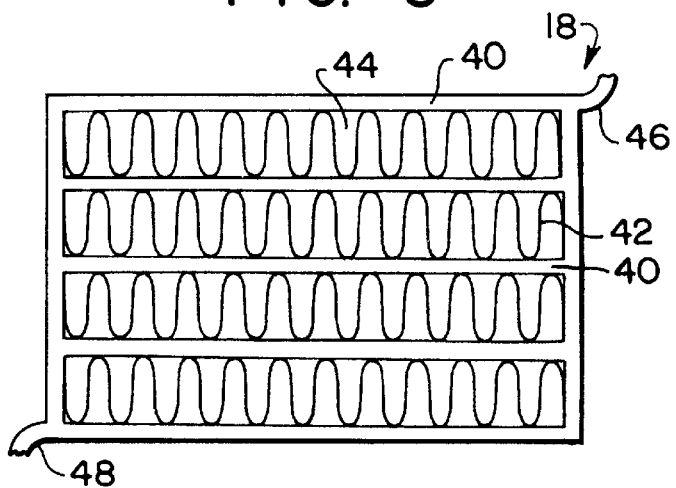
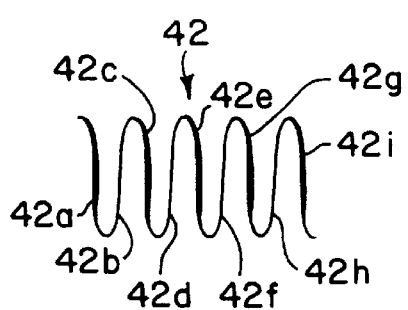
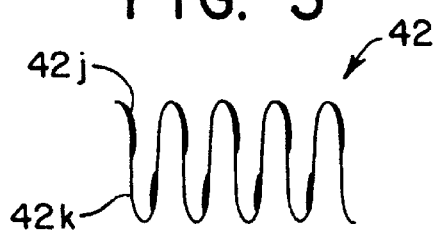
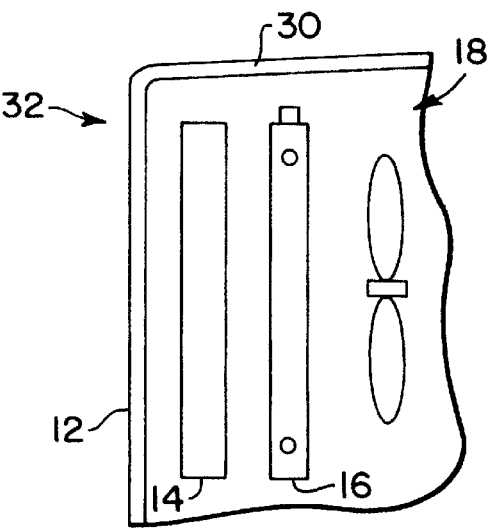

METHOD OF CATALYTICALLY TREATING THE ATMOSPHERE AND HEAT EXCHANGE DEVICES PRODUCED THEREBY

BACKGROUND OF THE INVENTION

1. Field of the Invention

The present invention relates to a method for the low temperature cleaning of the atmosphere and more particularly to the rendering of the outer surface of a heat exchanger, such as a radiator of a motor vehicle, capable of catalytically converting pollutants to harmless compounds without adversely affecting the functioning of the heat exchanger.

2. Discussion of the Related Art

A review of literature relating to pollution control reveals that the general approach is to reactively clean waste streams entering the environment. If too much of one pollutant or another is detected or being discharged, the tendency had been to focus on the source of the pollutant. For the most part gaseous streams are treated to reduce the pollutants prior to entering the atmosphere.

It has been disclosed to treat atmospheric air directed into a confined space to remove undesirable components therein. However, there has been little effort to treat pollutants which are already in the environment; the environment has been left to its own self cleansing systems.

References are known which disclose proactively cleaning the environment. U.S. Pat. No. 3,738,088 discloses an air filtering assembly for cleaning pollution from the ambient air by utilizing a vehicle as in mobile cleaning device. A variety of elements are disclosed to be used in combination with a vehicle to clean the ambient air as the vehicle is driven through the environment. In particular, there is disclosed ducting to control air stream velocity and direct the air to various filter means. The filter means can include filters and electronic precipitators. Catalyzed postfilters are disclosed to be useful to treat nonparticulate or aerosol pollution such as carbon monoxide, unburned hydrocarbons, nitrous oxide and/or sulfur oxides, and the like.

Another approach is disclosed in U.S. Pat. No. 5,147,429. There is disclosed a mobile airborne air cleaning station. In particular this patent features a dirigible for collecting air. The dirigible has a plurality of different types of air cleaning devices contained therein. The air cleaning devices disclosed include wet scrubbers, filtration machines, and cyclonic spray scrubbers.

The difficulty with devices disclosed to proactively clean the atmospheric air is that they require new and additional equipment. Even the modified vehicle disclosed in U.S. Pat. No. 3,738,088 requires ducting and filters which can include catalytic filters.

Responsive to the difficulties associated with devices with proactively treating the atmosphere, the Assignee herein in U.S. patent application Ser. No. 08/410,445 filed on Mar. 24, 1995, (abandoned), U.S. patent application Ser. No. 08/682, 174 filed Jul. 16, 1996 U.S. patent application Ser. No. 08/589,182 filed Jan. 19, 1996, and U.S. patent application Ser. No. 08/589,030 filed Jan. 19, 1996, each incorporated herein by reference, disclosed apparatus in related methods for treating the atmosphere by employing a moving vehicle. In preferred embodiments a portion of the cooling system (e.g. the radiator) is coated with a catalytic or adsorption composition. Additionally, a fan associated with the cooling system can operate to draw or force air into operative contact with the radiator. Pollutants contained within the air such as ozone and/or carbon monoxide are then converted to non-polluting compounds (e.g. oxygen gas and carbon dioxide).

The Assignee herein also has pending U.S. patent application Ser. No. 08/412,525 filed on Mar. 29, 1995, (abandoned), U.S. patent application Ser. No. 08/589,032 filed Jan. 19, 1996 incorporated herein by reference, which discloses devices and methods for proactively treating the atmosphere employing a stationary object such as an automobile at rest, a billboard, an air conditioning unit and alike with catalytic composition.

The application of a catalytic composition to the surface of a heat exchange device such as a radiator of a motor vehicle presents problems which can adversely affect the heat exchange properties of the device. For example, the catalytic composition can act as an insulator thereby reducing the ability the radiator to dissipate heat.

It would therefore be a significant advance in the art of reducing pollution to employ heat exchange devices for the treatment of air to remove pollutants without adversely affecting the heat exchange properties of the device. It would be of further advance in the art if this problem could be overcome in an effective and cost efficient manner.

SUMMARY OF THE INVENTION

The present invention generally relates to a method to treat the atmosphere to remove pollutants therefrom. A heat exchange device such as a radiator of a motor vehicle is treated so that the outer surface thereof catalytically instigates the conversion of pollutants in the atmosphere into harmless compounds without adversely affecting the heat exchange properties of the device. The present invention also encompasses heat exchange devices which can perform in this manner.

The term "atmosphere" is defined herein as the mass of air surrounding the earth. The term "ambient air" shall mean the atmosphere which is drawn or forced towards the outer surface of the heat exchange device. It is intended to include air which has been heated either incidentally or by a heating means.

In accordance with the present invention, the surface of the heat exchange device must be provided with a substance which can effectively instigate the catalytic conversion of pollutants into harmless compounds. The surface of the heat exchange device must therefore be capable of converting pollutants such as hydrocarbons, carbon monoxide and ozone into harmless compounds such as oxygen, carbon dioxide and water vapor.

In general, the present invention is directed to a method of catalytically treating the atmosphere to convert pollutants to harmless compounds comprising treating an outer surface of the heat exchange device to render said surface capable of catalytically converting said pollutants. In one aspect of the invention, the outer surface of the heat exchange device is made of or provided with a catalytically active substance such as a base metal catalyst, precious metal catalyst or combination thereof. As used herein the terms "base metal catalyst" and "precious metal catalyst" shall include the base metals and precious metals themselves as well as compounds containing the same e.g. salts of precious metals and salts and oxides of base metals. The surface is then treated to increase the surface area thereof. Surface treatments include contacting the heat exchange device with acid to provide a "pitted" surface having a very high surface area which facilitates the desired catalytic reaction. Optionally the treated outer surface may receive additional catalytic metal by applying a catalytic composition to a portion of the treated surface.

In an alternative embodiment of the invention, the outer surface is coated with a catalyst composition. However, in order to prevent a reduction in heat exchange capabilities of the heat exchange device, the catalyst composition is coated on less than the entire outer surface of the heat exchange device and/or is coated on a surface of the heat exchange device which is not directly engaged in heat exchange activity.

The heat exchange device is any device which operates to contact fluids (gases and liquids) having different temperatures so that an exchange of heat is made by the proximity of the two fluids. For purposes of illustration only, the radiator of a motor vehicle is employed herein as a typical example. It will be appreciated that heat exchange devices are found in air conditioning units and the like are suitable for use in the present invention.

The ambient air is drawn over the heat exchange device by natural wind currents or by the use of an air drawing means such as a fan or the like to draw or force ambient air into operative contact with the heat exchange device having the catalytic surface thereon. By way of example, the fan may be positioned in a tunnel, or as part of an air conditioning system or, as previously indicated, preferably in motor vehicles as part of the conventional cooling system. The fan is typically operated by a power source such as a battery, preferably the conventional twelve volt battery used in a motor vehicle, solar panel and the like. In accordance with a further aspect of the invention, when a catalyst composition is coated on a portion of the heat exchange surfaces of the heat exchange device and/or on non-heat exchange surfaces, it is desirable to provide a porous, protective coating to protect the catalyst composition from contamination and premature aging through such contaminates as salt, dirt, oil and the like.

BRIEF DESCRIPTION OF THE DRAWINGS

The following drawings in which like reference characters indicate like parts are illustrative of embodiments of the invention and are not intended to limit the invention as encompassed by the claims forming part of the application.

FIG. 1 is a side schematic view of a truck showing a grille, air conditioner condenser, radiator, fan and engine;

FIG. 2 is a perspective view of a radiator of a motor vehicle;

FIG. 3 is an enlarged cross-sectional view of a radiator;

FIG. 4 is a partial front view of a series of corrugated plates of a radiator coated with a catalyst composition in accordance with one embodiment of the present invention;

FIG. 5 is a partial front view of a series of corrugated plates of a radiator coated with a catalyst composition in accordance with another embodiment of the invention;

DETAILED DESCRIPTION OF THE INVENTION

Figure 6:
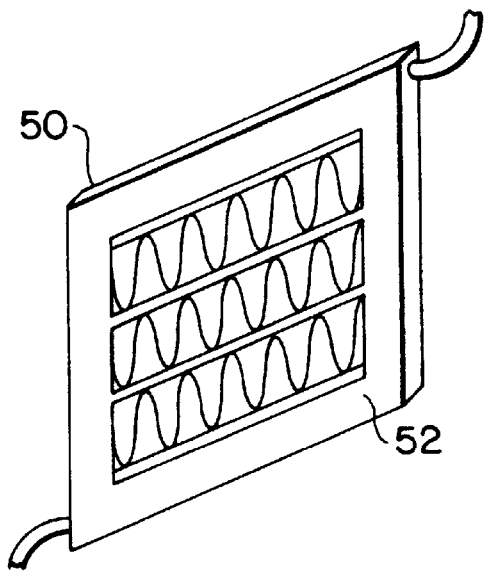
FIG. 6 is a rear view of a radiator showing the rear surface of the radiator coated with a catalyst composition in accordance with the present invention.

The present invention is directed to a method of treating the surface of a heat exchange device so that pollutants contained in ambient air may be readily converted to harmless compounds. The surface of the heat exchange device may be rendered catalytic if the surface itself is made of or provided with catalytically active metals or a catalyst composition may be applied to the surface of the heat exchanger. When a catalyst composition is applied to the outer surface of the heat exchanger, it covers only a portion thereof and/or is applied to non-heat exchange surfaces so as to prevent degradation of the heat exchange properties of the heat exchange device. The present invention is particularly adapted for the conversion of hydrocarbons, ozone and carbon monoxide into harmless compounds such as oxygen, carbon dioxide and water vapor.

The atmosphere contacting surface is the outer surface of a heat exchange device such as a radiator. Any heat exchange device in which there is a flow of ambient air therethrough may be treated in accordance with the present invention. Of particular importance to the present invention is the rendering of the outer surface of the heat exchange device capable of catalytically converting pollutants to harmless compounds without adversely affecting the heat exchange activity of the device.

In accordance with one aspect of the present invention, the outer surface of the heat exchange device (e.g. a radiator) is partially coated with a catalyst composition. In particular, from about 1 to 99% of the outer surface, preferably from about 25 to 75% is covered with the catalyst composition. To provide the desired partial coating, the non-coated portion can be covered by tape or by a coating containing a material such as Teflon. Useful and preferred catalyst compositions comprise at least one base metal catalyst and/or at least one precious metal catalyst. The amount of the base metal and the amount of the precious metal may vary and may be tailored to the pollutants contained in the atmosphere. Generally, the base metal catalyst is present in an amount of from about 0.05 to 5.0% by weight, preferably from about 0.1 to 2.0% by weight based on the total weight of the catalyst composition. The amount of the precious metal is in the range of up to 20% by weight, preferably from about 0.5 to 10% by weight based on the total weight of the catalyst composition.

The base metals which may be employed for the catalyst composition include all base metals which can affectively convert ozone to oxygen and/or carbon monoxide to carbon dioxide. The preferred base metals include iron, copper, chromium, zinc, manganese, compounds containing the same and combinations thereof. The base metals are typically used in the form of oxides.

The precious metals are platinum group components which include the metals and their compounds. Such metals can be selected from platinum, palladium, rhodium and ruthenium, gold and/or silver components. The preferred precious metals are platinum, palladium and mixtures thereof. Platinum is the most preferred of the precious metals. In a preferred catalyst composition, the precious metal is principally dispersed at the surface of the base metal catalyst. This means that at least 50% of the precious metal catalyst is on or close to the surface of the base metal catalyst so as to insure a rapid conversion of the pollutants in the ambient air to harmless by-products.

The catalyst composition is also provided with a suitable support material which has a preferably high surface area. The preferred materials are refractory oxides such as those selected from the group consisting of ceria, alumina, titania, silica, zirconia, and mixtures thereof with alumina being the most preferred refractory oxide support. It is preferred that the refractory oxide support have a high surface area to maximize the amount of the catalytic material within a given unit area. The term "high surface area" as it pertains to the refractory oxide support shall generally mean that the surface area of the support is at least 100 m²/g preferably in the range of from about 100 to 300 m²/g.

As previously indicated, the amount of the base metal catalyst and the amount of the precious metal catalyst can vary over a wide range. In a preferred catalyst composition, the percent by weight ratio of the precious metal catalyst to the base metal catalyst is at least 1:1. A preferred weight ratio of the precious metal catalyst to the base metal catalyst is in the range of from about 8:1 to 12:1.

The combination of the base metal and precious metal at the surface thereof provides a catalyst composition which operates at low temperatures to effectively convert carbon monoxide and ozone to harmless by-products.

The catalyst composition may be applied to the radiator surface by dipping and/or spraying techniques. In accordance with the present invention, the catalyst composition is coated on less than all of the heat exchange surfaces of the radiator, preferably from about 25 to 75 percent of the radiator surface.

As previously indicated, areas of the atmosphere contacting surfaces which are not to be coated may be covered with a material which prevents the catalyst composition from being deposited thereon. Such materials include common tapes (e.g. masking tape) and coating materials such as those containing Teflon or other material which resists adherence by the catalyst composition.

The covering material is applied to the atmosphere contacting surface followed by the catalyst composition to the areas to be coated. Any of the catalyst composition which spills over to the non-coated areas may be removed, for example, by removing the covering material.

The pattern of application of the catalyst composition is virtually unlimited so long as the catalyst composition covers less than the entire heat exchange surface of the heat exchange device. For example, the catalyst composition can be applied in spaced-apart rows extending the length of heat exchange device. Alternatively, the catalyst composition can be applied to portions of opposed sides of the heat exchange device.

In another aspect of the invention, the catalyst composition may be applied to non-heat exchange surfaces of the heat exchange device. "Non-heat exchange surfaces" means that these surfaces do not engage in heat exchange between respective fluids. When applied to said surfaces, there is obviously no interference with the heat exchange properties of the device. Accordingly, the non-catalytic surfaces can be coated up to their entirety with the catalyst composition if desired. Examples of non-catalytic surfaces of heat exchanges include the rear or back surfaces and extensions of the heat exchange device (e.g. fins and the like) which are not in contact with the heat-exchange fluids passing therethrough.

The heat exchange surfaces of the heat exchange device can be rendered catalytic if the surface itself is made of or provided with catalytically active substances (e.g. base metals alone or in combination with minor amounts of precious metals). In order to provide an effective catalytic surface, the surface area of the typical heat exchange device is desirably increased. This can be accomplished by treating the surface of the heat exchange device with an acid to provide a "pitted" outer surface. The thus treated heat exchange device can provide an effective system for catalytically converting pollutants to harmless compounds. Because there is no catalyst composition applied to the heat exchange surfaces in this embodiment, the acid treatment may be applied to the entire surface of the heat exchange device or only a portion thereof.

A non-catalytic surface of the radiator may be rendered catalytic by applying base metals alone or in combination with precious metals to the radiator surface. The catalytic metals may be applied by vaporizing the metal and depositing the vaporized metal on the radiator surface.

It should be understood, however, that in some cases it is desirable to add a catalyst composition to the pitted surfaces to improve conversion rates. The same type of catalyst compositions as previously described may be used. In this event, the heat exchange surfaces of the heat exchange device must not be covered in their entirety in order to prevent degradation of heat exchange properties.

In operation of the present invention, air is drawn or forced over the catalytic surface by natural wind currents or by air drawing devices such as fans. For land use motor vehicles, the heat exchange surfaces are preferably those of the radiator. It should be understood, however, that other heat exchange devices such as air conditioning condensers and the like may be treated in a like manner.

In a most preferred embodiment of the present invention, the atmosphere contacting surfaces are appropriate surfaces of a radiator. By treating the radiator surface as described herein pollutants can be readily removed from the atmosphere without compromising the heat exchange properties of the radiator.

The present invention will be understood by those skilled in the art by reference to accompanying FIGS. 1–8. The present invention can be applied to heat exchange devices of any type and to both heat exchange and non-heat exchange surfaces. What is particularly important in accordance with the present invention is that the heat exchange characteristics of the heat exchange device be maintained. As the ambient air encounters the catalytic surface of the heat exchange device, hydrocarbons, carbon monoxide and/or ozone are catalytically reacted to produce harmless by-products such as oxygen, carbon dioxide, and water vapor.

It will be appreciated by those skilled in the art that when the heat exchanger is associated with a vehicle, any suitable vehicle can be employed. Vehicles include cars, trucks, trains, boats, ships, airplanes, dirigibles, balloons, and the like. Preferably in a motor vehicle, the atmosphere contacting surfaces are surfaces located toward the front of the vehicle in the vicinity of the cooling system fan. Useful contact surfaces include the outside surfaces of the radiator, air conditioner condenser, and the like which are all located and supported within the housing of the vehicle.

FIG. 1 illustrates a truck 10 schematically containing a variety of vehicle components wherein a radiator or air conditioner condenser comprise atmosphere contacting surfaces. The vehicle includes a grille 12, an air conditioner condenser 14, a radiator 16 and a radiator fan 18. It will be understood that other vehicle components can be found in the truck.

Referring to FIGS. 1 and 2, the preferred atmosphere contacting surfaces include the front 13 and side 15 surfaces of the air conditioning condenser 14, the front 17 and side 19 surfaces of the radiator 16. These surfaces are located within the housing 24 of the truck. They are typically under the hood of the truck between the front 26 of the truck and the engine 28. The air conditioner condenser 14 and the radiator 16 can be directly or indirectly supported by the housing 24 or a frame (not shown) within the house.

FIG. 2 generally shows a schematic view of a radiator-air conditioning condenser assembly. The automobile comprises a housing 30. There is a front end 32 of the motor vehicle having a grille 12 supported on the front of the housing 30. An air conditioner condenser 14, a radiator 16 and a radiator fan 18 can be located within the housing 30.

The surfaces of the air conditioner condenser 14 and the radiator 16 can be treated in accordance with the present invention to provide a catalytic surface without adversely affecting the heat exchange properties of the devices. The most preferred atmosphere contacting surface is the outer surface of the radiator 16. A typical radiator has front and rear surfaces with spaced apart flat tubes having therebetween a plurality of radiator corrugated plates. More specifically and referring to FIG. 3, there is shown a radiator 18 including spaced apart tubes 40 for the flow of a first fluid and a series of corrugated plates 42 therebetween defining a pathway 44 for the flow of a second fluid transverse to the flow of the first fluid. The first fluid such as antifreeze is supplied from a source (not shown) to the tubes 40 through an inlet 46. The antifreeze enters the radiator 18 at a relatively low temperature through the inlet 46 and eventually leaves the radiator through an outlet 48. The second fluid such as air passes through the pathway 44 and thereby comes into heat exchange relationship with the first fluid passing through the tubes 40.

In accordance with the present invention, the surfaces of the corrugated plates 42 of the radiator 18 can be treated to provide a catalytic surface which does not interfere with the heat exchange properties of the radiator. In one embodiment of the invention, the catalyst composition is coated on the corrugated plates 42 in space-apart rows. Referring specifically to FIG. 4, there is shown an embodiment of the invention wherein alternating corrugated plates 42 are coated with a catalyst composition for removing pollutants from the atmosphere. As shown specifically in FIG. 4, surfaces 42a, 42c, 42e, 42g and 42i are coated with the catalyst composition while surfaces 42b, 42d, 42f, 42h and 42j are not. As a consequence, the radiator 18 is provided with catalytic surfaces capable of converting pollutants to harmless compounds while, at the same time, capable of performing its heat exchange function in a efficient manner through the exposed, non-coated surfaces.

In another embodiment of the invention, the catalyst coating is applied to all of the corrugated surfaces but only on a portion thereof. Referring to FIG. 5, each of plates 42 are coated on a portion of the surface thereof to provide a catalytic surface 42j and a non-catalytic surface 42k. In this embodiment, each corrugated plate provides a catalytic surface for the conversion of pollutants to harmless compounds while enabling the radiator to perform its heat exchange function through all of the corrugated plates.

In accordance with the present invention, non-heat exchange surfaces of the radiator or other heat exchange devices may be coated with the catalyst composition without interfering with the heat exchange properties of the device. In particular, non-heat exchange surfaces of the radiator may be coated with the catalyst composition and/or non-heat exchange extension may be added to the heat exchange device and coated with the catalyst composition.

Referring to FIG. 6, there is disclosed a view of a radiator including a housing 50 and corrugated plates 42 in which the rear surfaces 52 of the corrugated plates 42 are coated with the catalyst composition. The rear surfaces 52 are non-heat exchange surfaces because ambient air passing into contact with the rear surfaces has already been heated by the cooling fluid and therefore heat exchange is not occurring at the rear end of the radiator.

Figure 7:
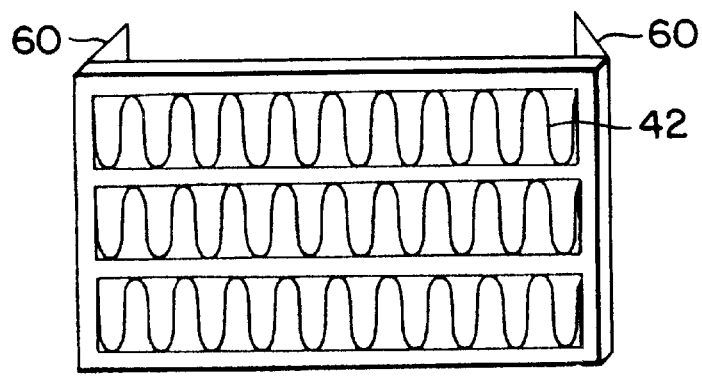
FIG. 7 is a partial perspective view of a radiator with fins coated with a catalyst composition in accordance with the present invention.

In another embodiment of the invention as shown in FIG. 7, the radiator is provided with at least one, preferably a plurality of projections 60 (e.g. fins) which are non-heat exchange surfaces. The fins 60 are coated with the catalyst composition in a customary manner (e.g. by spraying). When in contact with ambient air, the surfaces of the fins, heated via conduction from the heat exchange surface, are capable of catalytically converting pollutants contained within the air to harmless compounds.

Figure 8:
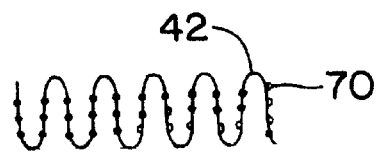
FIG. 8 is a partial front view of corrugated plates of a radiator with the surfaces treated to increase the surface area thereof.

In another aspect of the present invention, the surface of the radiator may be treated to provide a catalytic surface without coating the same with a catalytic composition. Radiators made of metals which are capable of catalytically converting hydrocarbons, carbon monoxide and/or ozone to harmless compounds may be used in this embodiment. In order to provide a suitable catalytical surface, it is essential that the surface area of the radiator being increased. This can be done in any manner which roughens the surface of the radiator. Referring to FIG. 8, a preferred way of treating the outer surface of the radiator is to contact the same with a metal capable of reacting with the acid to form a roughened surface. The roughening of the surface provides a series of spaced apart pits or depressions 70 which dramatically increase the surface area of the radiator thereby providing an adequate number of catalytic cites for the pollutant conversion reactions.

The acids which can be used to treat the metals include mineral acids such as hydrochloric acid, sulfuric acid, phosphoric acid and the like. Organic acids such as acidic acids, formic acid and the like may also be used.

The acid may be applied to the radiator by dipping, spraying, brushing and the like. The amount of acid which is used and the duration of the treatment is within the routine skill of the art and is sufficient to provide a noticeable increase in the surface area of the radiator without damaging the heat exchange properties of the radiator.

In each embodiment described above a porous protective coating may be provided to the catalytic surface. The protective coating contains a protective substance which is stable at temperatures up to 100° C. and is resistant to chemicals, salts, dirt and other contaminants which may adversely affect the catalyst composition. Plastic materials meeting this criteria are known and include polyethylene, polypropylene, polytetrafluoroethylene (e.g. Teflon) and the like. Polytetrafluoroethylene is a preferred material for the protective coating.

The protective coating may be applied by dipping and spraying techniques. A preferred method of application is to use a non-halogen containing aerosol spray.

What is claimed:

1. A method of catalytically treating the atmosphere to convert pollutants selected from the group consisting of ozone, hydrocarbons, and carbon monoxide to harmless compounds comprising contacting the atmosphere with a heat exchange device wherein the outer surface of the heat exchange device has been coated with a catalytic layer comprising catalyst selected from the group consisting of manganese oxide catalysts, precious metal catalysts and combinations thereof capable of catalytically converting said pollutants, said catalytic layer being further coated with a porous protective coating.

2. The method of claim 1 comprising applying the catalytic layer to a portion of the outer surface area of the heat exchange device.

3. The method of claim 2 comprising applying the catalytic layer to from about 1 to 99% of the outer surface of the heat exchange device.

4. The method of claim 3 comprising applying the catalytic layer to from about 25 to 75% of the outer surface of the heat exchange device.

5. The method of claim 2 comprising applying the catalytic layer in spaced apart rows to the heat exchange device.

6. The method of claim 2 wherein the heat exchange device contains a plurality of corrugations, said method comprising applying the catalytic layer to a portion of each of the corrugations.

7. The method of claim 1 wherein the catalyst composition contains from about 0.05 to 5.0% by weight of manganese oxide catalyst and less than about 20% by weight of a precious metal catalyst, based on the total weight of the catalyst composition.

8. The method of claim 7 wherein the precious metal catalyst is platinum, palladium or mixtures thereof.

9. The method of claim 7 wherein the % by weight ratio of the precious metal catalyst to the manganese oxide catalyst is at least 1:1.

10. The method of claim 1 wherein at least 50% of the precious metal catalyst is on or close to the surface of the manganese oxide catalyst.

11. The method of claim 1 wherein the protective coating is a plastic.

12. The method of claim 11 wherein the protective substance is selected from the group consisting of polyethylene, polypropylene and polytetrafluoroethylene.

13. The method of claim 11 comprising spraying the protective substance as an aerosol onto the outer surface of the heat exchange device.

14. The method of claim 1, wherein said manganese oxide catalyst is manganese dioxide.

15. The method of claim 14, wherein the manganese dioxide is in the form of $\alpha$-$MnO_2$.

16. The method of claim 15, wherein the $\alpha$-$MnO_2$ is selected from the group consisting of hollandite, cryptomelane, manjiroite and coronadite.

17. The method of claim 16, wherein the $\alpha$-$MnO_2$ is cryptomelane.

18. The method of claim 17, wherein the protective substance is a plastic.

19. The method of claim 18, wherein the protective substance is selected from the group consisting of polyethylene, polypropylene and polytetrafluoroethylene.

20. The method of claim 1, wherein the catalytic layer contains a precious metal catalyst.

21. The method of claim 20, wherein the precious metal catalyst is platinum, palladium, or mixtures thereof.

22. The method of claim 21, wherein the protective substance is a plastic.

23. The method of claim 22, wherein the protective substance is selected from the group consisting of polyethylene, polypropylene and polytetrafluoroethylene.

24. The method of any of the claims 1, 2 to 9, 11 to 13, 14 to 19, and 20 to 23, wherein the heat exchange device is an automobile radiator.

25. The method of any of the claims of 1, 2 to 9, 11 to 13, 14 to 18, and 20 to 23, wherein the heat exchange device is an automobile air conditioning condenser.

26. The method of any of the claims of 1, 2 to 9, 11 to 13, 14 to 19, and 20 to 23, wherein the heat exchange device is part of non-automotive air conditioning system.

* * * * *